(12) United States Patent
Suharno et al.

(10) Patent No.: US 7,210,300 B2
(45) Date of Patent: May 1, 2007

(54) REFRIGERANT CHARGING SYSTEM AND METHOD WITH CARTRIDGES

(75) Inventors: Anwar Suharno, Barrington, IL (US); Dean P. Pfefferle, Elgin, IL (US); Craig F. Govekar, Gurnee, IL (US); Kenneth R. Meldahl, Fox Lake, IL (US); Larry G. Moller, Harvard, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 342 days.

(21) Appl. No.: 10/892,438

(22) Filed: Jul. 16, 2004

(65) Prior Publication Data

US 2006/0010888 A1      Jan. 19, 2006

(51) Int. Cl.
*F25B 45/00* (2006.01)
(52) U.S. Cl. ............................................. 62/77; 62/292
(58) Field of Classification Search .................... 62/77, 62/149, 292
See application file for complete search history.

(56) References Cited

U.S. PATENT DOCUMENTS 4,261,178 A * 4/1981 Cain ........................... 62/149
4,470,265 A    9/1984 Correia
4,624,112 A * 11/1986 Proctor ........................ 62/149

FOREIGN PATENT DOCUMENTS

DE      38 00 055 A1      7/1988

* cited by examiner

*Primary Examiner*—Melvin Jones
(74) *Attorney, Agent, or Firm*—McDermott Will & Emery LLP

(57) ABSTRACT

A refrigerant charging system and method for charging a refrigeration system with refrigerant includes a refrigerant source, one or more cartridges, an input line, a scale, a pressure sensor and a temperature sensor. The input line connects the refrigerant source to the cartridge. A valve is disposed between the refrigerant source and cartridge. The scale measures the weight of the cartridge. The pressure and temperature sensors adjust the remaining refrigerant that ensures full charge on the refrigeration system. A heater can be connected to the refrigerant source to raise the temperature of the refrigerant within the refrigerant source, and a controller can be attached to the components of the refrigeration charging system. The system and method are used to charge the refrigeration system of, e.g., an automotive vehicle.

13 Claims, 2 Drawing Sheets

REFRIGERANT CHARGING SYSTEM AND METHOD WITH CARTRIDGES

TECHNICAL FIELD

The disclosure relates generally to refrigerant charging systems and, more specifically, to a high precision refrigerant charging system that is portable.

BACKGROUND ART

Most refrigeration systems are not 100% free of leaks. Thus, the amount (or mass) of refrigerant within the refrigeration system decreases over time. Refrigeration systems, however, are designed to operate with a specific amount of refrigerant. Therefore, loss of refrigerant in a refrigeration system over time typically reduces the efficiency of the refrigeration system. Also, if the amount of refrigerant in the refrigeration system drops to a certain level, the refrigeration system may cease to operate and/or be damaged. For these reasons, a common maintenance operation for a refrigeration system is to recharge the refrigerant within the refrigeration system.

The recharging operation typically involves flushing the refrigeration system of any remaining refrigerant and, if present, other materials within the refrigeration system. Once the refrigeration system is flushed, a predetermined amount of new refrigerant is introduced into the refrigeration system. An important component of conventional refrigeration charging systems is the device that measures the amount of refrigerant introduced into the refrigeration system. Since the refrigeration system is designed to operate with a specific amount of refrigerant, too little or too much refrigerant can reduce the effectiveness of the recharging operation.

One conventional device used to measure the amount of refrigerant introduced into the refrigeration system is a load cell (or scale). Essentially, the load cell measures the weight of a tank containing the refrigerant before the refrigerant is introduced into the refrigeration system and then afterwards. The difference between the two readings is the amount of refrigerant introduced into the refrigeration system. There are, however, certain problems that are associated with the use of a load cell in conventional recharging systems. Load cells are sensitive to vibration, which can throw off the measurements. Also, since the load cell determines the weight of the entire tank used to supply the refrigerant, which can weigh several hundred pounds or more, sensitivity of the load cell is reduced.

Furthermore, recent advances in refrigeration technology employ carbon dioxide as the refrigerant, which is stored at a pressure as much as ten times higher than the pressure at which conventional refrigerants are stored, and the resulting increase in storage pressure necessitates thicker walls for the tank. These thicker walls add additional weight to the tank, which further decreases the sensitivity of the load cell.

Another conventional device used to measure the amount of refrigerant introduced into the refrigeration system employs mass flow technology. As recognized by those skilled in the art, mass flow technology implements a sensor that measures the flow rate of fluid (i.e., the refrigerant) flowing past a certain point. However, use of mass flow technology is very expensive, and the expense is even greater when an increased sensitivity for calculating the amount of refrigerant delivered is desired. The accuracy of mass flow technology is dependent on the fluid state since the mass flow sensors do not measure gas as well as liquid. Although most refrigerants are in a liquid form during the recharging operation, carbon dioxide is in a gaseous state during a recharging operation. Also, mass flow technology does not work well with two-phase fluids. There is, therefore, a need for a refrigerant charging system and method that is more accurate and vibration-resistant, and less expensive than conventional refrigeration charging systems, particularly when the refrigerant is carbon dioxide.

SUMMARY OF THE DISCLOSURE

Described is a system for charging a refrigeration system with refrigerant. The charging system includes a refrigerant source, one or more cartridges, an input line and a scale. The input line connects the refrigerant source to the cartridge. A valve is also disposed between the refrigerant source and the cartridge. The scale measures the weight of the cartridge. A heater may optionally be connected to the refrigerant source for raising the temperature of the refrigerant within the refrigerant source. A controller can be attached to the components of the refrigeration charging system. The refrigerant preferably is preferably carbon dioxide.

The refrigeration system is charged with refrigerant by determining mass of refrigerant needed to charge the refrigeration system and transferring refrigerant from the refrigerant source to a cartridge. After the refrigerant is transferred to the cartridge, the filled cartridge is disconnected from the refrigerant source. The filled cartridge is then connected to the refrigeration system. After the refrigeration system and cartridge are connected, refrigerant is transferred to the refrigeration system. The cartridge is disconnected from the refrigeration system after pressure of the refrigerant in the cartridge and the refrigeration system equalizes.

The weight of the cartridge is measured both prior to and during the refrigerant being transferred to the cartridge. If only a single cartridge is used to charge the refrigeration system, the filled cartridge is disconnected from the refrigerant source after the weight of the cartridge during the transfer of the refrigerant to the cartridge becomes equal to or greater than the weight of the cartridge prior to the transfer of the refrigerant to the cartridge plus the determined mass of the refrigerant needed to charge the refrigeration system. If two or more cartridges are used to charge the refrigeration system, the filled cartridge is disconnected from the refrigerant source after the weight of the cartridge during the transfer of the refrigerant to the cartridge becomes equal to or greater than the weight of the cartridge prior to the transfer of the refrigerant to the cartridge plus the determined mass of the refrigerant needed to charge the refrigeration system. The mass of the refrigerant needed to charge the refrigeration system is based upon the mass of the refrigerant to be introduced into the refrigeration system and the volume of the number of cartridges needed to charge the refrigeration system.

Additional advantages will become readily apparent to those skilled in the art from the following detailed description, wherein only an exemplary embodiment of the present invention is shown and described, simply by way of illustration of the best mode contemplated for carrying out the present invention. As will be realized, the disclosure is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENTS

Figure 1:
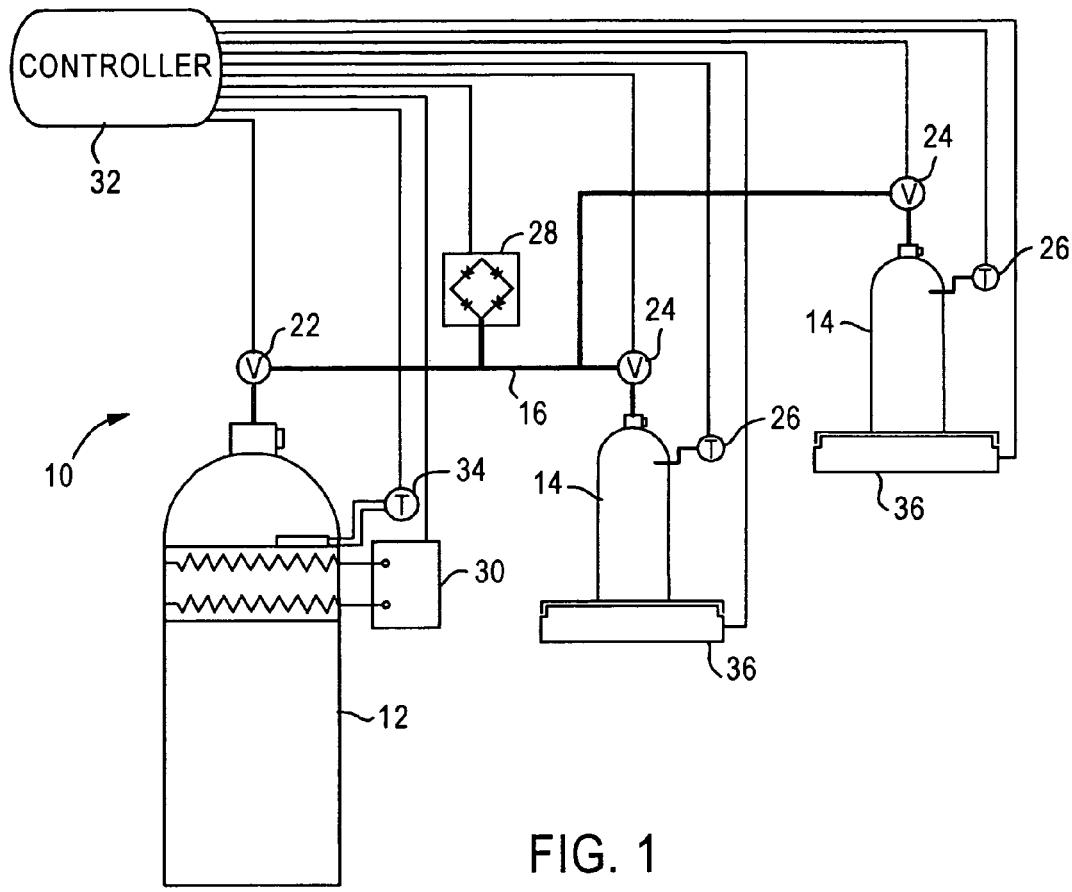
FIGS. 1 and 2 are schematic views of a refrigerant charging system, according to the disclosure.
Figure 2:
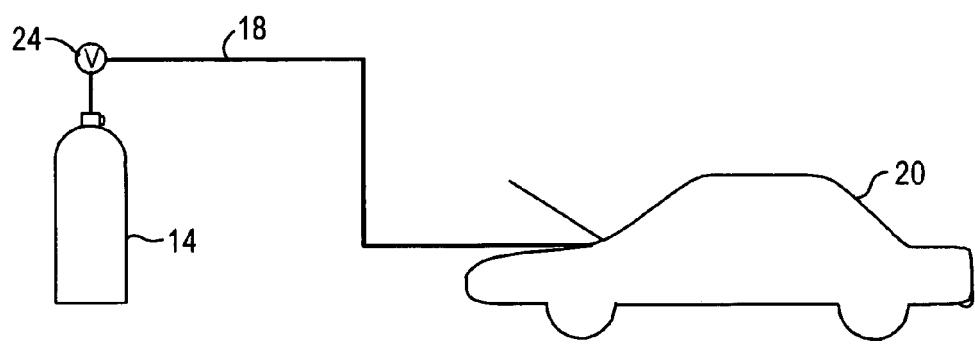

An example of a refrigerant charging system 10 is illustrated in FIGS. 1 and 2. The refrigerant charging system includes a refrigerant source 12, one or more cartridges 14, an input line 16, and an output line 18. The input line 16 fluidly connects the refrigerant source 12 to the cartridge or cartridges 14, and the refrigerant source 12 may include a source control valve 22 for controlling the flow of refrigerant from the refrigerant source 12 to the input line 16. The output line 18 fluidly connects a cartridge 14 to a refrigeration system (not shown) to be charged of a vehicle 20. An example of a refrigerant to be used in the system described above and the method described below is carbon dioxide.

The cartridge 14 may include a cartridge control valve 24 for controlling flow of refrigerant to the cartridge 14 from the input 16 or the flow of refrigerant from the cartridge 14 to the refrigeration system of the vehicle 20. The cartridge 14 and/or input line 16 can also include a temperature sensor 26 and a pressure sensor 28 for respectively measuring the temperature and pressure of the refrigerant entering the cartridge 14, and the refrigerant charging system 10 is not limited as to any particular types or configurations of temperature and pressure sensors 26, 28

The amount of refrigerant in the cartridge 14 needed to charge a refrigeration system is dependent upon the temperature and pressure of the cartridge. The determined mass of the refrigerant in the cartridge 14 is equal to the required vehicle refrigerant charge plus the remaining refrigerant in the cartridge after pressure equalization between the cartridge 14 and the vehicle 20. The remaining amount is determined using the pressure and temperature sensors 26, 28 at the end of the cartridge filling process. As the pressure and/or temperature of the remaining refrigerant changes, the mass of the remaining amount of refrigerant also varies.

The cartridge 14 is not limited as to a particular size. However, reducing the size of the cartridge 14 enables the cartridge 14 to be readily handled by a single operator without lifting assistance, which allows for greater flexibility in using the cartridge 14 to charge the refrigeration system of the vehicle. Furthermore, as will be discussed in more detail below, the method of charging the refrigeration system typically involves charging the refrigeration system with a single cartridge 14 of refrigerant, which would entail the cartridge 14 being sized to accommodate a single charge of refrigerant.

The refrigerant charging system 10 also includes load cells 36 that are associated with each of the cartridges 14. The load cells 36 are used to measure the weight of the cartridges 14 before, during, and after charging the cartridges 14 with refrigerant. The load cells 36 of the current refrigerant charging system 10 may differ from the loads cells previously described in that the current load cell 36 can be sized to measure the weight of only the cartridge 14.

In contrast, the previously described load cells were sized to measure the weight of an entire tank of refrigerant, which is comparable to the current refrigerant source 12. Since the weight of an entire tank of refrigerant is considerably more than the weight of an individual cartridge, the previously disclosed load cells must be capable of measuring much greater weights. However, when the weight to be measured by a particular load cell increases, the sensitivity of the load cell decreases. Thus, by reducing the weight capacity of the current load cells 36, the sensitivity of the weight measured by the current load cells 36 can be greater than that of the previously described loads cells. Furthermore, since a cartridge 14 with a much smaller capacity can be used in place of a refrigerant source tank 12, reduction in tank capacity allows for easier isolation of the load cell 36 from vibration.

The refrigerant source 12 is not limited as to a particular type of source for providing refrigerant. However, in a current aspect of the refrigerant charging system 10, the refrigerant source 12 is a constant-volume tank. The tank 12 of refrigerant may also include a heater 30 for adjusting the temperature of refrigerant within the tank 12, which is measured by a source temperature sensor 34. The use of a heater 30 to adjust the temperature of a fluid within a tank is well known in the art, and the present refrigerant charging system 10 is not limited as to any particular type or configuration of heater 30. However, in a current aspect of the refrigerant charging system 10, the heater 30 is an electrically-adjusted resistance band that can be wrapped around the tank 12. By adjusting the temperature of the refrigerant in the tank 12, a higher pressure can be maintained in the tank 12 than in the cartridge 14, which results in flow of refrigerant from the tank 12 to the cartridge 14.

The refrigerant charging system 10 can optionally include a controller 32 connected to at least one of the sensors 26, 28, 34, control valves 22, 24, load cells 36 and the heater 30. Although the control valves 22, 24 and the heater 30 can be operated manually, the controller 32 may be used to automatically control the operation of these devices. Additionally, information from the sensors 26, 28, 34 and load cells 36 can be sent to the controller 30, either automatically or manually, and the controller 30 may use this information during the control of the control valves 22, 24 and the heater 30.

Figure 3:
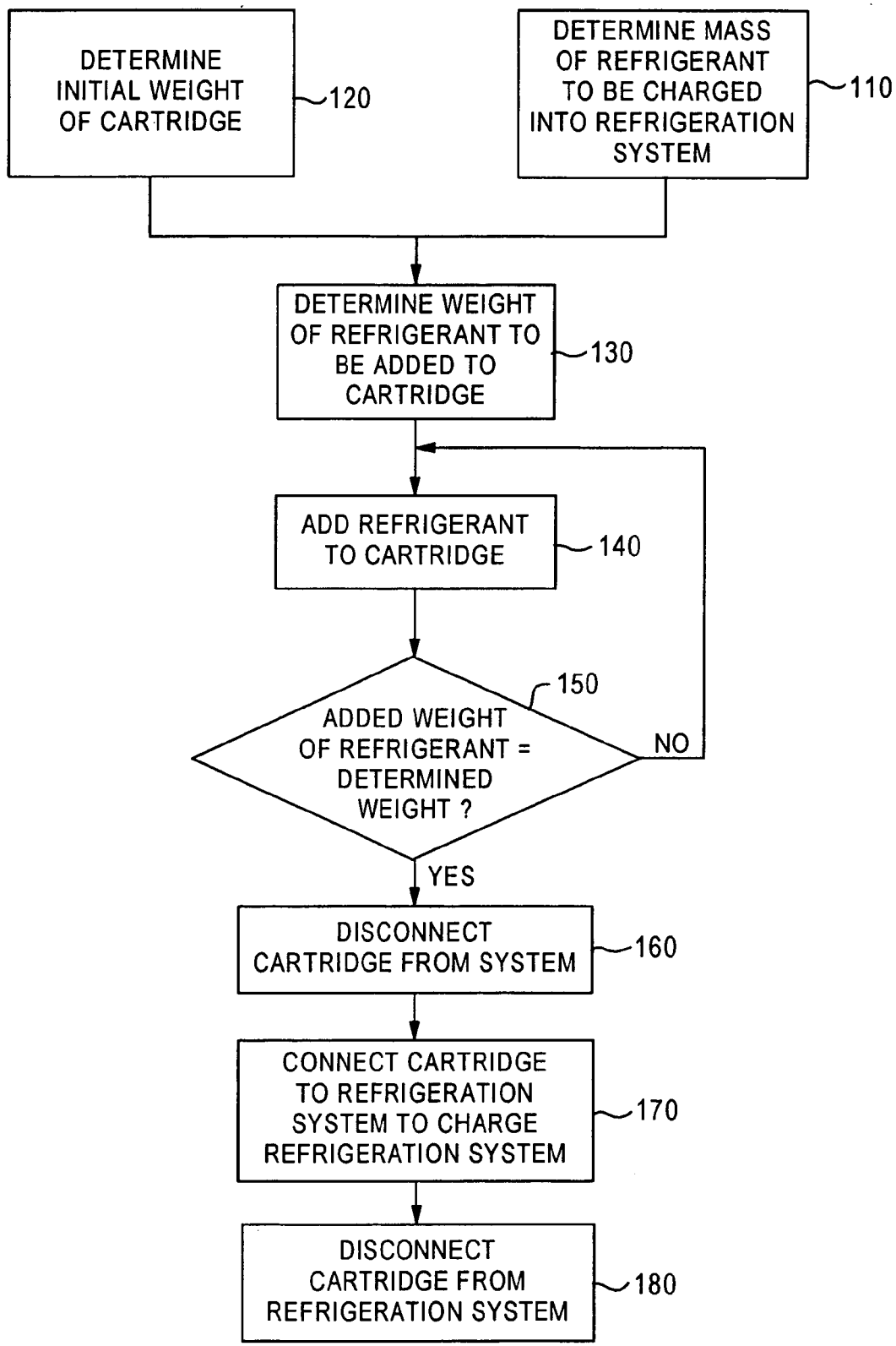
FIG. 3 is a flow chart of a method of charging a refrigeration system, according to the disclosure.

The operations of the refrigerant charging system 10 is schematically illustrated in the flow chart of FIG. 3. In an initial step 110, a required amount (mass) of refrigerant to be charged into the refrigeration system of the vehicle is determined. Many techniques of determining the mass of refrigerant to be introduced into a refrigeration system are well known in the art, and the present methodology of charging a refrigeration system is not limited to any particular technique. For example, after flushing the refrigeration system of any remaining refrigerant, which may involve discharging any remaining refrigerant and pulling a vacuum within the refrigeration system, the mass of new refrigerant to be introduced into the refrigeration system can be predefined by the manufacturer of the refrigeration system.

After step 120, in which an initial weight of the cartridge 14 is determined using the load cell 36, in step 130, the weight of the refrigerant to be added to the cartridge 14 is determined. This calculation uses the required mass of refrigerant to be charged determined in step 110 and also factors in the size of the cartridge 14 and the mass of the refrigerant that will be remaining within the cartridge 14 after charging of the refrigeration system when the pressure of the refrigerant in the cartridge 14 and the refrigeration system is equalized.

In step 140, a mass of refrigerant is introduced from the refrigerant source 12 into the cartridge 14 via the input line 16 by opening the source control valve 22 and the cartridge control valve 24. During this step, one or more cartridges 14 can be filled with refrigerant. Depending upon the amount of refrigerant that has been calculated to be introduced into the cartridge 14, the heater 30 connected to the refrigerant source 12 may be operated to increase the temperature of the refrigerant entering into the cartridge 14. This enables the refrigerant in the refrigerant source 12 to be at a higher pressure than the remaining refrigerant in the cartridge 14 and creates a flow of refrigerant from the refrigerant source 12 to the cartridge 14. This also results in an increase in pressure of the refrigerant in the cartridge 14. When the pressure of the refrigerant in the cartridge 14 is increased, the mass of refrigerant in the cartridge 14 also increases.

In step 150, the weight of the cartridge 14 is measured using the load cell 36 and compared to the initial weight of the cartridge plus the amount of refrigerant to be added to the cartridge 14. When the actual weight of the cartridge 14 equals the desired weight of the cartridge 14, the cartridge 14 is isolated from the refrigerant source 12 in step 160, which may involve closing the source control valve 22 and/or the cartridge control valve 24.

After the cartridge 14 is isolated from the refrigerant source 12, the cartridge 14 is connected to the refrigeration system of the vehicle 20 using, for example, the output line 18. The cartridge control valve 24 is then opened and refrigerant is allowed to flow from the cartridge 14 through the output line 18 and into the refrigeration system of the vehicle 20 in step 170. The pressure of the refrigerant in the refrigeration system of the vehicle 20 and the refrigerant in the cartridge 14 is allowed to equalize, and the cartridge control valve 24 is then closed. The closing of the cartridge control valve 24 isolates the cartridge 14 from the refrigeration system of the vehicle 20. In step 180, the cartridge 14 is disconnected from the refrigeration system of the vehicle 20, and the entire process may be repeated to charge a refrigeration system of another vehicle 20.

Through use of the present refrigerant charging system, refrigerant can be charged into a refrigeration system with comparable or improved accuracy than prior technology used for the same purpose. Also, since the present refrigerant charging system can function without mass flow technology, the present refrigerant charging system is less expensive than those systems that employ mass flow technology and has increased accuracy, such as with carbon dioxide refrigerants. Furthermore, since the present refrigerant charging system may employ a load cell having a reduced capacity, the sensitivity of the load cell can be increased.

The disclosed concepts may be practiced by employing conventional methodology and equipment. Accordingly, the details of such equipment and methodology are not set forth herein in detail. In the previous descriptions, numerous specific details are set forth, such as specific formulas, processes, techniques, etc., in order to provide a thorough understanding of the present invention. However, it should be recognized that the present invention may be practiced without resorting to the details specifically set forth.

Only an exemplary aspect of the present disclosure and but a few examples of its versatility are shown and described. It is to be understood that the present invention is capable of use in various other combinations and environments and is capable of changes or modifications within the scope of the inventive concept as expressed herein.

What is claimed is:

1. A method of charging a refrigeration system with refrigerant, comprising the steps of:
    determining a mass of refrigerant for charging the refrigeration system;
    transferring the refrigerant from a refrigerant source to a cartridge;
    disconnecting the filled cartridge from the refrigerant source;
    connecting the filled cartridge to the refrigeration system after disconnecting the filled cartridge from the refrigerant source;
    transferring refrigerant from the cartridge to the refrigeration system; and
    disconnecting the cartridge from the refrigeration system after pressures of the refrigerant in the cartridge and the refrigeration system equalize.

2. The method according to claim 1, further comprising steps of weighing the cartridge prior to, during and after the transfer of the refrigerant to the cartridge.

3. The method according to claim 2, including disconnecting the filled cartridge from the refrigerant source after the weight of the cartridge during the transfer of the refrigerant to the cartridge becomes equal to or greater than the weight of the cartridge prior to the transfer of the refrigerant to the cartridge plus the determined mass of the refrigerant for charging the refrigeration system.

4. The method according to claim 3, wherein the mass of the refrigerant for charging the refrigeration system is based upon the mass of the refrigerant to be introduced into the refrigeration system, and pressure, temperature and volume of a single cartridge.

5. The method according to claim 3, wherein the refrigeration system is charged with a single cartridge to be fully charged.

6. The method according to claim 2, including disconnecting the filled cartridge from the refrigerant source before the weight of the cartridge during the transfer of the refrigerant to the cartridge becomes equal to or greater than the weight of the cartridge prior to the transfer of the refrigerant to the cartridge plus the determined mass of the refrigerant for charging the refrigeration system.

7. The method according to claim 6, including charging the refrigeration system with at least two cartridges to be fully charged.

8. The method according to claim 6, wherein the mass of the refrigerant for charging the refrigeration system is based upon the mass of the refrigerant to be introduced into the refrigeration system and pressure, temperature, and volume of two or more cartridges.

9. The method according to claim 1, including transferring refrigerant from the refrigerant source to two or more cartridges.

10. The method according to claim 1, further comprising the step of applying heat to the refrigerant source to raise the temperature of the refrigerant within the refrigerant source.

11. The method according to claim 1, wherein the refrigerant is carbon dioxide.

12. A refrigeration charging system for charging a refrigeration system with refrigerant, comprising:
    a refrigerant source for storing the refrigerant;
    one or more cartridges, the one or more cartridges configured to be connected to the refrigeration system;
    an input line connecting the refrigerant source to the one or more cartridges;
    a scale for measuring the weight of at least one of the one or more cartridges;
    at least one valve between the refrigerant source and the one or more cartridges;
    a controller connected to the scale and the valve; and
    a heater attached to the refrigerant source.

13. A refrigeration charging system for charging a refrigeration system with refrigerant, comprising:
   a refrigerant source for storing the refrigerant;
   one or more cartridges, the one or more cartridges configured to be connected to the refrigeration system;
   an input line connecting the refrigerant source to the one or more cartridges;
   a scale for measuring the weight of at least one of the one or more cartridges;
   a pressure sensor and a temperature sensor connected to at least one of the one or more cartridges and the input line; and
   a controller connected to a scale, a valve, a pressure sensor and a temperature sensor;
   wherein the refrigerant is carbon dioxide.

* * * * *